(12) United States Patent
Liskey et al.

(10) Patent No.: US 9,327,248 B1
(45) Date of Patent: May 3, 2016

(54) COPOLYIMIDE MEMBRANES WITH HIGH PERMEABILITY AND SELECTIVITY FOR OLEFIN/PARAFFIN SEPARATIONS

(71) Applicant: UOP LLC, Des Plaines, IL (US)

(72) Inventors: Carl W. Liskey, Chicago, IL (US); Chunqing Liu, Arlington Heights, IL (US); Howie Q. Tran, Skokie, IL (US); Nicole K. Karns, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/560,207

(22) Filed: Dec. 4, 2014

(51) Int. Cl.
*B01D 71/64* (2006.01)
*B01D 53/22* (2006.01)
*B01D 69/08* (2006.01)

(52) U.S. Cl.
CPC .............. *B01D 71/64* (2013.01); *B01D 53/228* (2013.01); *B01D 69/08* (2013.01); *B01D 2053/224* (2013.01)

(58) Field of Classification Search
CPC ...... B01D 53/228; B01D 69/08; B01D 71/64; B01D 2053/224; B01D 2257/702; B01D 2257/7022
USPC ............................................................ 95/50
See application file for complete search history.

(56) References Cited

U.S. PATENT DOCUMENTS

| | | | | |
|---|---|---|---|---|
| 4,474,858 A * | 10/1984 | Makino | .................. | B01D 71/64 96/13 |
| 5,034,024 A * | 7/1991 | Hayes | .................... | B01D 71/64 95/54 |
| 5,074,891 A * | 12/1991 | Kohn | .................... | B01D 71/64 95/47 |
| 5,085,676 A * | 2/1992 | Ekiner | .................. | B01D 69/08 96/10 |
| 5,112,941 A * | 5/1992 | Kasai | .................... | B01D 71/64 96/14 |
| 5,716,430 A * | 2/1998 | Simmons | ............... | B01D 71/64 96/14 |
| 5,725,633 A * | 3/1998 | Ozcayir | .............. | B01D 53/228 95/45 |
| 6,497,747 B1 * | 12/2002 | Ding | .................... | B01D 53/228 95/45 |
| 2004/0215045 A1 * | 10/2004 | Herrera | ................ | B01D 53/228 585/818 |
| 2009/0286078 A1 * | 11/2009 | Lee | ........................ | B01D 71/64 428/364 |
| 2012/0322646 A1 * | 12/2012 | Liu | ........................ | B01D 71/64 502/4 |
| 2014/0255636 A1 * | 9/2014 | Odeh | .................... | B01D 71/64 96/4 |

* cited by examiner

Primary Examiner — Jason M Greene

(57) ABSTRACT

A copolyimide polymer membrane is provided for separation of hydrocarbons including separation of olefins from paraffins and isoparaffins from other paraffins. The copolyimide polymer membranes include a poly(3,3'-diaminobenzophenone-3,3',5,5'-tetramethyl-4,4'-methylene dianiline-pyromellitic dianhydride) (abbreviated as poly(DAB-TMMDA-PMDA)). The copolyimide membranes prepared from poly(DAB-TMMDA-PMDA) with varying molar ratios of DAB to TMMDA (abbreviated as PI-DAB-T) showed excellent separation properties for propylene/propane separation.

2 Claims, No Drawings

COPOLYIMIDE MEMBRANES WITH HIGH PERMEABILITY AND SELECTIVITY FOR OLEFIN/PARAFFIN SEPARATIONS

BACKGROUND OF THE INVENTION

This invention relates to copolyimide membranes with high permeability and high selectivity for olefin/paraffin separations.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including nitrogen enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules, such as hydrocarbons, pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Light olefins, such as propylene and ethylene, are produced as co-products from a variety of feedstocks in a number of different processes in the chemical, petrochemical, and petroleum refining industries. Various petrochemical streams contain olefins and other saturated hydrocarbons. Typically, these streams are from stream cracking units (ethylene production), catalytic cracking units (motor gasoline production), or the dehydrogenation of paraffins.

Currently in industry the separation of olefin and paraffin components is performed by cryogenic distillation, which is expensive and energy intensive due to the low relative volatilities of the components. Large capital expense and energy costs have created incentives for extensive research in this area of separations, and low energy-intensive membrane separations have been considered as an attractive alternative.

In principle, membrane-based technologies have advantages of both low capital cost and high-energy efficiency compared to conventional separation methods for olefin/paraffin separations, such as propylene/propane and ethylene/ethane separations. Three main types of membranes have been reported for olefin/paraffin separations. They are facilitated transport membranes, polymer membranes, and inorganic membranes. Facilitated transport membranes, or ion exchange membranes, which sometimes use silver ions as a complexing agent, have very high olefin/paraffin separation selectivity. However, poor chemical stability due to carrier poisoning, high cost, and low flux currently limit practical applications of the facilitated transport membranes.

Separation of olefin from paraffin via conventional polymer membranes has not been commercially successful due to inadequate selectivities and permeabilities of the polymer membrane materials, as well as due to plasticization issues. Polymers that are more permeable are generally less selective than are less permeable polymers. A general trade-off has existed between permeability and selectivity (the so-called "polymer upper bound limit") for all kinds of separations, including olefin/paraffin separations. In recent years, substantial research effort has been directed to overcoming the limits imposed by this upper bound. Various polymers and techniques have been used, but without much success in terms of improving the membrane selectivity. On the other hand, inorganic membranes, such as carbon molecular sieve and zeolite inorganic membranes, potentially offer adequate selectivities. However, they are brittle and currently too costly to be commercially useful for large scale applications.

Accordingly, it is desirable to provide processes for olefin/paraffin separation using cost effective membranes that have high selectivity and that are highly permeable.

The present invention discloses copolyimide membranes with unusual high selectivity and permeability for olefin/paraffin separations such as for propylene/propane, butene/butane, and pentene/pentane separations as well as methods for making and using these membranes.

SUMMARY OF THE INVENTION

The invention provides a copolyimide membrane for olefin/paraffin separations comprising a plurality of repeating units of formula (I).

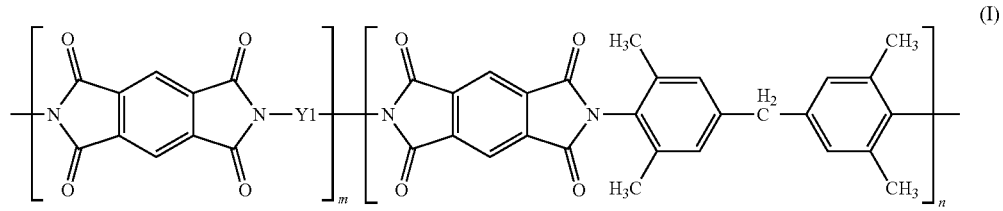

wherein m and n are independent integers from 10 to 500; n/m is in a ratio from 10:1 to 1:10; Y1 is selected from the group consisting of

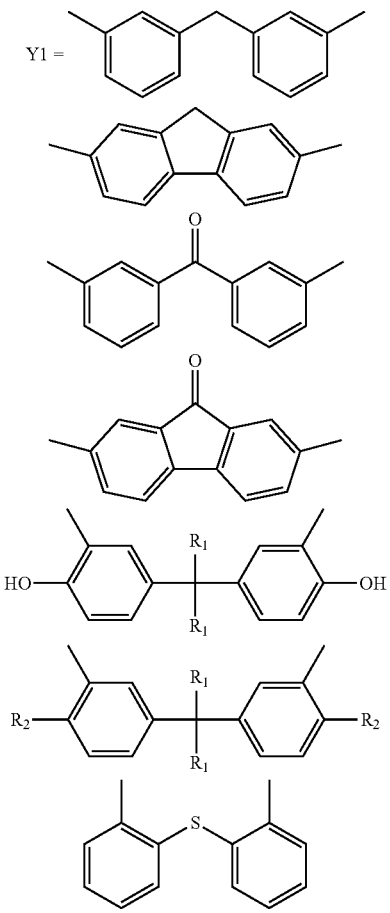

and mixtures thereof, $R_1$ is $CH_3$, $CF_3$, or H; $R_2$ is $-(CH_2)_pCH_3$, and p is an integer from 0 to 11. The invention further provides a process for olefin/paraffin separations using the above polyimide membrane.

DESCRIPTION OF THE INVENTION

The present invention generally relates to copolyimide membranes with unusually high selectivity and permeability for olefin/paraffin separations such as for propylene/propane, butene/butane, and pentene/pentane separations as well as methods for making and using these membranes.

The present invention provides a high selectivity and high permeability copolyimide membrane for olefin/paraffin separations. One copolyimide polymer used for the preparation of the high selectivity and high permeability polyimide membranes for olefin/paraffin separations in the present invention is a poly(3,3'-diaminobenzophenone-3,3',5,5'-tetramethyl-4,4'-methylene dianiline-pyromellitic dianhydride) derived from the polycondensation reaction of 3,3'-diaminobenzophenone (DAB) and 3,3',5,5'-tetramethyl-4,4'-methylene dianiline (TMMDA) with pyromellitic dianhydride (PMDA). The molar ratio of DAB to TMMDA is in a range from 10:1 to 1:10. The copolyimide membrane described in the present invention is fabricated from the corresponding copolyimide described herein. As an example, copolyimide membranes prepared from poly(DAB-TMMDA-PMDA) (abbreviated as PI-DAB-T) showed excellent separation properties for propylene/propane separation. The PI-DAB-T membrane has shown high propylene permeability of 10.1 Barrers and high propylene/propane selectivity of 24.5 for propylene/propane separation.

Another copolyimide membrane described in the present invention is a poly(2,2'-diaminophenyl sulfide-TMMDA-PMDA) derived from the polycondensation reaction of 2,2'-diaminophenyl sulfide (DAPS) and TMMDA with PMDA. The molar ratio of DAPS to TMMDA is in a range from 10:1 to 1:10. The copolyimide membrane described in the present invention is fabricated from the corresponding copolyimide described herein. As an example, copolyimide membrane prepared from poly(DAPS-TMMDA-PMDA) (abbreviated as PI-DAPS-T) showed good separation properties for propylene/propane separation. The PI-DAPS-T membrane showed propylene permeability of 11.6 Barrers and high propylene/propane selectivity of 22.2 for propylene/propane separation.

Another copolyimide membrane described in the present invention is a poly(2,2'-bis(3-amino-4-hydroxyphenyl) hexafluoropropane-TMMDA-PMDA) derived from the polycondensation reaction of 2,2'-bis(3-amino-4-hydroxyphenyl) hexafluoropropane (APAF) and TMMDA with PMDA. The molar ratio of APAF to TMMDA is in a range from 10:1 to 1:10. As an example, a copolyimide membranes prepared from poly(APAF-TMMDA-PMDA) (abbreviated as PI-APAF-T) showed good separation properties for propylene/propane separation. The PI-APAF-T membrane has propylene permeability of 6.24 Barrers and high propylene/propane selectivity of 18.3 for propylene/propane separation.

Yet another copolyimide membrane described in the present invention is a poly(2,2'-bis(3-amino-4-methylphenyl) hexafluoropropane-TMMDA-PMDA) derived from the polycondensation reaction of 2,2'-bis(3-amino-4-methylphenyl) hexafluoropropane (ATAF) and TMMDA with PMDA. The molar ratio of ATAF to TMMDA is in a range from 10:1 to 1:10. As an example, a copolyimide membranes prepared from poly(ATAF-TMMDA-PMDA) (abbreviated as PI-ATAF-T) showed good separation properties for propylene/propane separation. The PI-ATAF-T membrane has propylene permeability of 13.9 Barrers and high propylene/propane selectivity of 15.5 for propylene/propane separation.

The copolyimide with unusual high selectivity and permeability for the preparation of polyimide membrane for olefin/paraffin separations described in the present invention comprises a plurality of repeating units of formula (I).

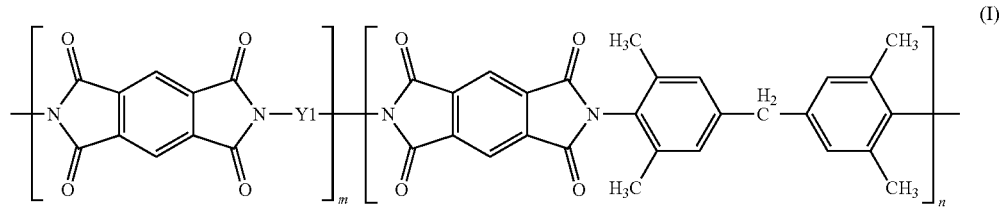

wherein m and n are independent integers from 10 to 500; wherein n/m is in a range of 10:1 to 1:10; wherein Y1 is selected from a group consisting of

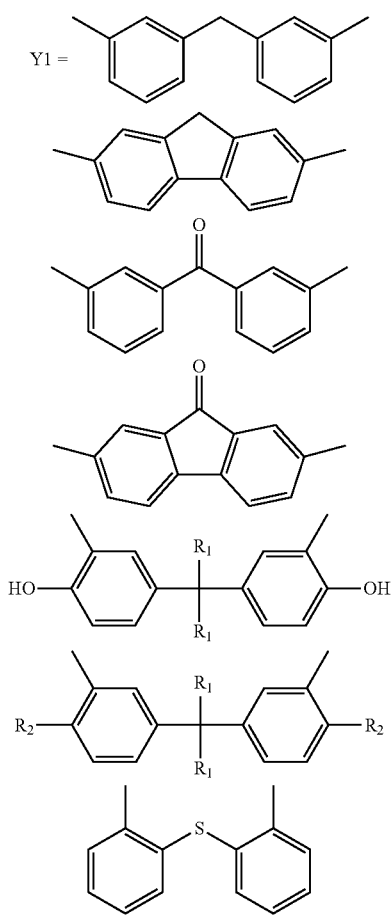

and mixtures thereof, wherein $R_1$ is $CH_3$, $CF_3$, or H; wherein $R_2$ is $-(CH_2)_pCH_3$, wherein p is an integer from 0 to 11, preferably p is an integer of 0 or 1.

The copolyimide polymers shown in formula (I) used for making the copolyimide membrane with unusual high selectivity and high permeability for olefin/paraffin separations in the current invention have a weight average molecular weight in the range of 20,000 to 1,000,000 Daltons, preferably between 50,000 to 500,000 Daltons.

The solvents used for dissolving the copolyimide polymer with unusual high selectivity and permeability for the preparation of copolyimide membrane for olefin/paraffin separations are chosen primarily for their ability to completely dissolve the materials and for ease of solvent removal in the membrane formation steps. Other considerations in the selection of solvents include low toxicity, low corrosive activity, low environmental hazard potential, availability and cost. Representative solvents for use in this invention include, but are not limited to, N-methylpyrrolidone (NMP), N,N-dimethyl acetamide (DMAC), tetrahydrofuran (THF), acetone, N,N-dimethylformamide (DMF), dimethyl sulfoxide (DMSO), 1,3-dioxolane, and mixtures thereof. Other solvents as known to those skilled in the art may also be used.

The invention provides a process for separating olefin from a mixture of olefin and paraffin using the copolyimide membrane with unusual high selectivity and high permeability described in the present invention, the process comprising: (a) providing a copolyimide membrane with unusual high selectivity and high permeability described in the present invention which is permeable to said olefin; (b) contacting the olefin/paraffin mixture on one side of the copolyimide membrane with unusual high selectivity and high permeability described in the present invention to cause said olefin to permeate the membrane; and (c) removing from the opposite side of the membrane a permeate gas composition comprising a portion of said olefin which permeated through said membrane.

The copolyimide membrane with unusual high selectivity and high permeability described in the present invention has immediate application to concentrate olefin in a paraffin/olefin stream for olefin cracking application. For example, the copolyimide membrane with unusual high selectivity and high permeability described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to obtain polymer grade propylene can be reduced. Another application for the copolyimide membrane with unusual high selectivity and high permeability described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The various embodiments of the present invention provide a process for the separation of paraffin and olefin, such as, for example, in gaseous streams produced from stream cracking, catalytic cracking, the dehydration of paraffins, and the like. The process utilizes a copolyimide membrane with unusual high selectivity and high permeability that is highly permeable but also highly selective to olefin, thus permitting olefin to permeate the membrane at a much higher rate than the paraffin. The membrane can take a variety of forms suitable for a particular application. For example, the membrane can be in the form of a flat sheet, hollow tube or fiber, and the like. In this regard, various embodiments of the process contemplated herein can be used to replace C2 and C3 splitters, as hybrid membrane distillation units for olefin purification, for recovery of olefins from polypropylene vent streams or from fluid catalytic cracking (FCC) off-gas streams, or the like. The process can also be used for the production of polymer grade propylene, thus offering significant energy, capital, and operating cost savings compared to conventional distillation.

The copolyimide membranes with unusual high selectivity and high permeability for olefin/paraffin separations described in the present invention can be fabricated into any convenient form suitable for a desired application. For example, the membranes can be in the form of hollow fibers, tubes, flat sheets, and the like. The membranes can also be in the form of thin film composite comprising a selective thin copolyimide polymer layer and a porous supporting layer comprising a polymer material or an inorganic material. The form of the membrane may depend upon the nature of the membrane itself and the ease of manufacturing the form. The membrane can be assembled in a separator in any suitable configuration for the form of the membrane and the separator may provide for co-current, counter-current, or cross-current flows of the feed on the retentate and permeate sides of the membrane. In one exemplary embodiment a copolyimide membrane of the present invention with unusual high selectivity and high permeability for olefin/paraffin separations in a spiral wound module is in the form of flat sheet having a thickness from about 30 to about 400 µm. A feed contacts a first surface of the membrane, a permeate permeates the copolyimide membrane and is removed therefrom, and a retentate, not having permeated the membrane, also is removed therefrom. In another exemplary embodiment a copolyimide membrane with unusual high selectivity and high permeability for olefin/paraffin separations in a hollow fiber module that is in the form of thousands, tens of thousands, hundreds of thousands, or more, of parallel, closely-packed hollow fibers or tubes. In one embodiment, each fiber has an outside diameter of from about 200 micrometers (µm) to about 700 millimeters (mm) and a wall thickness of from about 30 to about 200 µm. In operation, a feed contacts a first surface of the copolyimide membrane, a permeate permeates the membrane and is removed therefrom, and a retentate, not having permeated the membrane, also is removed therefrom. In another embodiment, a copolyimide membrane with unusual high selectivity and high permeability for olefin/paraffin separations can be in the form of flat sheet having a thickness in the range of from about 30 to about 400 µm.

The olefin/paraffin separation process using the copolyimide membrane with unusual high selectivity and high permeability starts by contacting a first surface of the membrane with an olefin/paraffin feed. The olefin may comprise, for example, propylene or ethylene and the paraffin may comprise propane or ethane, respectively. The olefin/paraffin feed comprises a first concentration of olefin and a first concentration of paraffin depending on the application for which the membrane separation is used. For example, a propane dehydrogenation process typically provides a feed containing about 35 mass percent propylene, whereas a feed from an FCC unit generally contains about 75 mass percent propylene. The flow rate and temperature of the olefin/paraffin feed have those values that are suitable for a desired application. Next, a permeate is caused to flow through the membrane and from a second surface of the membrane. Because the copolyimide membrane with unusual high selectivity and high permeability for olefin/paraffin separations is much more selective to the olefin than to the paraffin, the permeate has a concentration of olefin that is higher than the concentration of the olefin in the feed. In one exemplary embodiment, the concentration of the olefin in the permeate is 99.5 mass percent. In addition, while some paraffin may permeate through the membrane, the permeate has a concentration of paraffin that is less than the concentration of the paraffin in the feed. The permeate can then be removed from the second surface of the membrane. As the permeate passes through the membrane, a retentate or residue, which has not permeated the membrane, is removed from the first surface of the membrane. The retentate has a concentration of olefin that is lower than the concentration of olefin in the feed and lower than the concentration of the permeate. The retentate also has a concentration of paraffin that is higher than a concentration of paraffin that is in the feed.

EXAMPLES

The following examples are provided to illustrate one or more preferred embodiments of the invention, but are not limited embodiments thereof. Numerous variations can be made to the following examples that lie within the scope of the invention.

Example 1

Preparation and Evaluation of Copolyimide Dense Film Membranes from PI-DAB-T, PI-DAPS-T, PI-APAF-T, and PI-ATAF-T Polymers, Respectively 10.0 g of PI-DAB-T (or PI-DAPS-T, PI-APAF-T, or PI-ATAF-T) copolyimide synthesized from polycondensation reaction of a mixture of TMMDA and DAB diamines with PMDA dianhydride was dissolved in 40.0 g of NMP. The mixture was mechanically stirred for 2 hours to form a homogeneous casting dope. The resulting homogeneous casting dope was allowed to degas overnight. The PI-DAB-T (or PI-DAPS-T, PI-APAF-T, or PI-ATAF-T) dense film membrane was prepared from the bubble free casting dope on a clean glass plate using a doctor knife with a 18-mil gap. The membrane together with the glass plate was then heated to 60° C. overnight. Finally, the PI-DAB-T, PI-DAPS-T, PI-APAF-T, and PI-ATAF-T copolyimide dense film membranes were heated at 200° C. under vacuum for 48 hours to completely remove the residual solvents.

The PI-DAB-T, PI-DAPS-T, PI-APAF-T, and PI-ATAF-T copolyimide dense film membranes were tested for propylene/propane separation at 50° C. under 791 kPa (100 psig) pure single feed gas pressure. The results in the following Table show that PI-DAB-T, PI-DAPS-T, PI-APAF-T, and PI-ATAF-T copolyimide dense film membranes have shown excellent separation property for propylene/propane separation. The PI-DAB-T membrane has shown both high propylene permeability of 10.1 Barrers and high propylene/propane selectivity of 24.5. The PI-DAPS-T membrane has shown even higher propylene permeability of 11.6 Barrers and high propylene/propane selectivity of 22.2. The PI-APAF-T membrane displayed propylene permeability of 6.24 Barrers and a propylene/propane selectivity of 18.3. The PI-ATAF-T membrane displayed even higher propylene permeability of 13.9 Barrers and a propylene/propane selectivity of 15.5.

TABLE

Pure gas permeation test results of PI-DAB-T, PI-DAPS-T, PI-APAF-T, and PI-ATAF-T copolyimide dense film membranes for propylene/propane separation*

| Membrane | $P_{propylene}$ (Barrer) | $\alpha_{propylene/propane}$ |
|---|---|---|
| PI-DAB-T | 10.1 | 24.5 |
| PI-DAPS-T | 11.6 | 22.2 |
| PI-APAF-T | 6.24 | 18.3 |
| PI-ATAF-T | 13.9 | 15.5 |

*$P_{propylene}$ and $P_{propane}$ were tested at 50° C. and 791 kPa (100 psig); 1 Barrer = $10^{-10}$ cm$^3$(STP).cm/cm$^2$.sec.cmHg.

Example 2

Preparation of Asymmetric Integrally-Skinned Flat Sheet PI-DAB-T Copolyimide Membrane from PI-DAB-T Copolyimide Asymmetric integrally-skinned flat sheet PI-DAB-T copolyimide membrane was prepared via a phase inversion process from a casting dope comprising, by approximate weight percentages, 10 g of PI-DAB-T copolyimide, 35 g of N-methyl-2-pyrrolidone (NMP), 6.5 g of acetone, and 6.5 g of methanol. A film was cast on a Nylon cloth using a membrane casting machine then gelled by immersion in a 1.5° C. cold water bath, and then annealed in a hot water bath at 85° C. The resulting wet membrane was dried at 70° C. to remove water using a continuous membrane drier to form the dried flat sheet PI-DAB-T copolyimide membrane. The dried membrane was then coated with a high permeance coating material to form the final asymmetric integrally-skinned flat sheet PI-DAB-T copolyimide membrane of the present invention.

Example 3

Preparation of Asymmetric Integrally-Skinned Hollow Fiber PI-DAB-T Copolyimide Membrane from PI-DAB-T Polyimide Asymmetric integrally-skinned hollow fiber PI-DAB-T copolyimide membrane was prepared via a phase inversion process from a spinning dope comprising, by approximate weight percentages, 41 g of PI-DAB-T polyimide, 70 g of NMP, 13 g of acetone, and 13 g of methanol. The spinning dope was extruded at a flow rate of 2.6 mL/min through a spinneret at 50° C. spinning temperature. A bore fluid containing 10% by weight of water in NMP was injected to the bore of the fiber at a flow rate of 0.8 mL/min simultaneously with the extruding of the spinning dope. The nascent fiber traveled through an air gap length of 5 cm at room temperature with a humidity of 25%, and then was immersed into a water coagulant bath at 21° C. and wound up at a rate of 8.0 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form the dried hollow fiber PI-DAB-T copolyimide membrane. The dried membrane was then coated with a high permeance coating material to form the final asymmetric integrally-skinned hollow fiber PI-DAB-T copolyimide membrane of the present invention.

Specific Embodiments

While the following is described in conjunction with specific embodiments, it will be understood that this description is intended to illustrate and not limit the scope of the preceding description and the appended claims.

A first embodiment of the invention is a copolyimide membrane for olefin/paraffin separations comprising a copolyimide membrane that comprises a plurality of repeating units of formula (I)

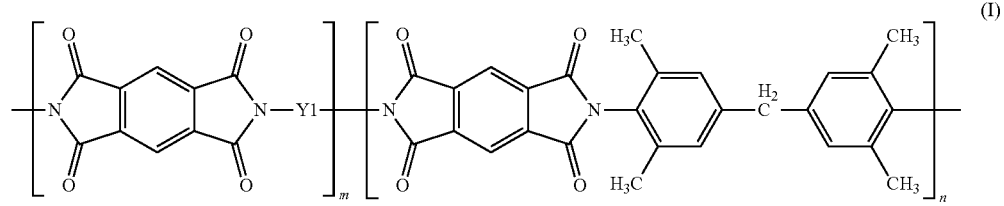

wherein m and n are independent integers from 10 to 500; n/m is in a ratio from 10:1 to 1:10; Y1 is selected from the group consisting of

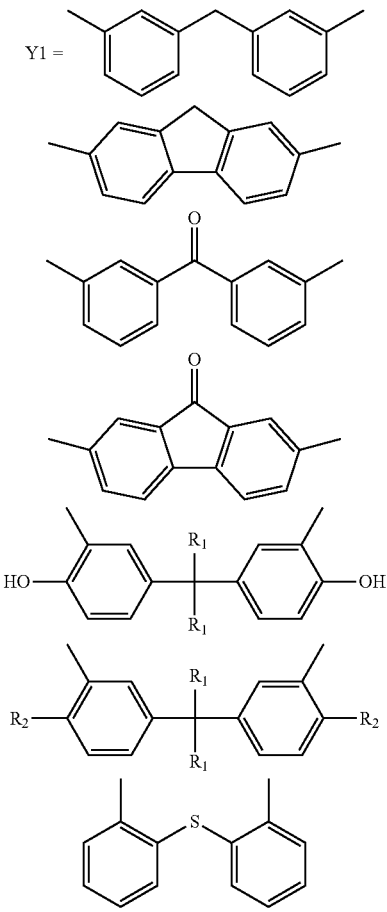

and mixtures thereof, $R_1$ is $CH_3$, $CF_3$, or H; $R_2$ is $-(CH_2)_pCH_3$, and p is an integer from 0 to 11. An embodiment of the invention is one, any or all of prior embodiments in this paragraph up through the first embodiment in this paragraph wherein p is 0 or 1. An embodiment of the invention is one, any or all of prior embodiments in this paragraph up through the first embodiment in this paragraph wherein the copolyimide membrane is comprising a poly(3,3'-diaminobenzophenone-3,3',5,5'-tetramethyl-4,4'-methylene dianiline-pyromellitic dianhydride). An embodiment of the invention is one, any or all of prior embodiments in this paragraph up through the first embodiment in this paragraph wherein the copolyimide membrane is comprising a poly(2,2'-diaminophenyl sulfide-3,3',5,5'-tetramethyl-4,4'-methylene dianiline pyromellitic dianhydride). An embodiment of the invention is one, any or all of prior embodiments in this paragraph up through the first embodiment in this paragraph wherein the copolyimide membrane is comprising a poly(2, 2'-bis(3-amino-4-hydroxyphenyl) hexafluoropropane-3,3',5,5'-tetramethyl-4,4'-methylene dianiline-pyromellitic dianhydride). An embodiment of the invention is one, any or all of prior embodiments in this paragraph up through the first embodiment in this paragraph wherein the copolyimide membrane is comprising a poly(2,2'-bis(3-amino-4-methylphenyl) hexafluoropropane-3,3',5,5'-tetramethyl-4,4'-methylene dianiline-pyromellitic dianhydride). An embodiment of the invention is one, any or all of prior embodiments in this paragraph up through the first embodiment in this paragraph wherein the copolyimide membrane is fabricated into a form selected from the group consisting of hollow fibers, tubes, and flat sheets.

A second embodiment of the invention is a process for the separation of hydrocarbons comprising: a) contacting a first surface of a copolyimide membrane with a feed stream comprising the hydrocarbons wherein the copolyimide membrane comprises a copolyimide polymer that comprises a plurality of repeating units of formula (I)

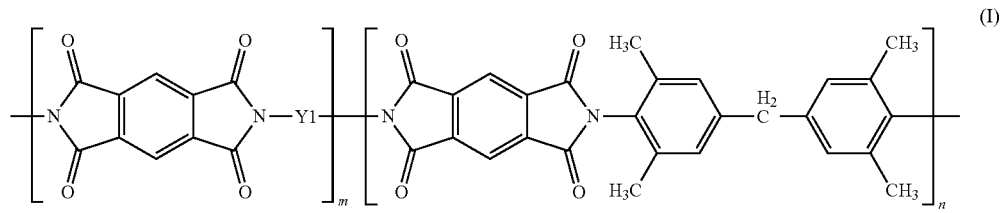

wherein m and n are independent integers from 10 to 500; n/m is in a ratio from 10:1 to 1:10; Y1 is selected from a group consisting of

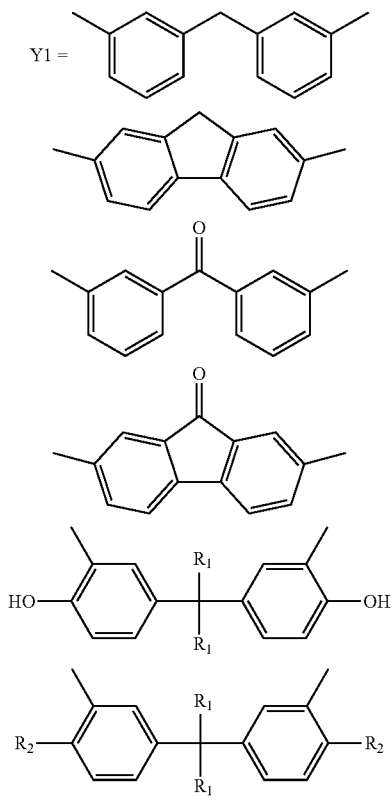

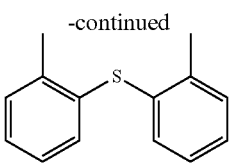

and mixtures thereof, $R_1$ is $CH_3$, $CF_3$, or H; $R_2$ is —$(CH_2)_p CH_3$, and p is an integer from 0 to 11; b) causing a permeate to flow through the copolyimide membrane and from a second surface of the copolyimide membrane wherein the permeate has a higher concentration of at least one component of the hydrocarbon than in the feed; and c) removing the permeate from the second surface of the copolyimide membrane. An embodiment of the invention is one, any or all of prior embodiments in this paragraph up through the second embodiment in this paragraph wherein the hydrocarbons comprise a mixture of paraffins and olefins. An embodiment of the invention is one, any or all of prior embodiments in this paragraph up through the second embodiment in this paragraph wherein the hydrocarbons comprise a mixture of isoparaffin and normal paraffins. An embodiment of the invention is one, any or all of prior embodiments in this paragraph up through the second embodiment in this paragraph wherein the hydrocarbons comprise a mixture of ethylene and ethane. An embodiment of the invention is one, any or all of prior embodiments in this paragraph up through the second embodiment in this paragraph wherein the hydrocarbons comprise a mixture of propylene and propane.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A copolyimide membrane for olefin/paraffin separations comprising a copolyimide membrane that comprises a plurality of repeating units of formula (I)

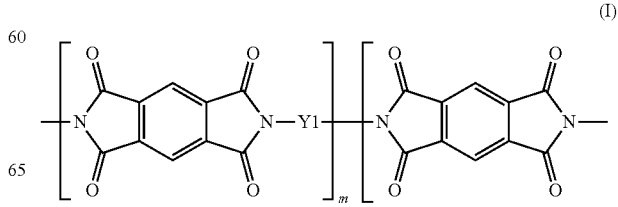

-continued

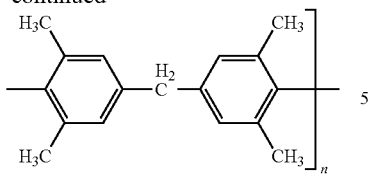

wherein m and n are independent integers from 10 to 500; n/m is in a ratio from 10:1 to 1:10; Y1 is selected from the group consisting of

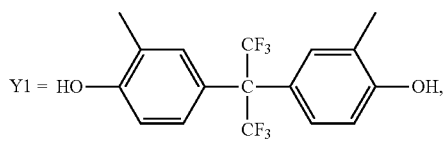

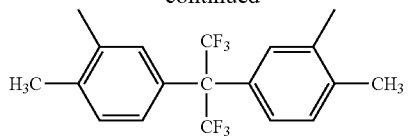

and mixtures thereof, wherein said copolyimide membrane comprises a poly(2,2'-bis(3-amino-4-hydroxyphenyl) hexafluoropropane-(3,3',5,5'-tetramethyl-4,4'-methylene dianiline-pyromellitic dianhydride) or a poly(2,2'-bis(3-amino-4-methylphenyl) hexafluoropropane-(3,3', 5,5'-tetramethyl-4,4'-methylene dianiline-pyromellitic dianhydride).

2. The copolyimide membrane of claim 1 fabricated into a form selected from the group consisting of hollow fibers, tubes, and flat sheets.

* * * * *